United States Patent [19]

Buldini et al.

[11] 4,258,263

[45] Mar. 24, 1981

[54] CASSETTE FOR LARGE FORMAT FILM UNIT

[75] Inventors: Daniel A. Buldini, Melrose; Donald P. Richard, Reading, both of Mass.

[73] Assignee: Polaroid Corporation, Cambridge, Mass.

[21] Appl. No.: 108,457

[22] Filed: Dec. 31, 1979

[51] Int. Cl.³ .................. G03D 13/08; G03B 41/18
[52] U.S. Cl. .................................. 250/480; 354/276
[58] Field of Search .................. 250/475, 480, 481; 354/276; 206/455

[56] References Cited

U.S. PATENT DOCUMENTS

| | | |
|---|---|---|
| 2,689,306 | 9/1954 | Land . |
| 2,709,223 | 5/1955 | Bachelder et al. .................. 250/480 |
| 2,823,317 | 2/1958 | Fairbank . |
| 3,103,864 | 9/1963 | Erikson et al. .................. 250/468 |
| 3,174,039 | 3/1965 | Frede et al. . |
| 3,327,115 | 6/1967 | Bartlett . |
| 3,330,953 | 7/1967 | Erikson .................. 250/477 |
| 3,371,208 | 2/1968 | Brackett et al. . |
| 3,383,507 | 5/1968 | Brackett et al. . |
| 3,804,625 | 4/1974 | Sorli .................. 96/67 |
| 4,186,308 | 1/1980 | Erikson .................. 250/480 |

Primary Examiner—Alfred E. Smith
Assistant Examiner—Janice A. Howell
Attorney, Agent, or Firm—John S. Vale

[57] ABSTRACT

A cassette for releasably holding a photosensitive film unit and locating the film unit at a film plane therein. The cassette includes base and cover sections coupled together in telescoping relation for movement toward and away from each other between releasably latched first and second closed positions. In the first closed position there is minimal pressure applied to the film unit to facilitate its removal from the cassette. When the case and cover sections are located in the second closed position sufficient pressure is applied to the film unit to urge it into intimate contact with a film plane defining bearing surface in the base section. In the illustrated embodiment the cassette is configured for radiographic applications and includes an intensifying screen that is urged into intimate contact with the film unit when the base and cover sections are located in the second closed positions.

17 Claims, 11 Drawing Figures

CASSETTE FOR LARGE FORMAT FILM UNIT

BACKGROUND OF THE INVENTION

The present invention relates to the field of photography and, more particularly, to a cassette for releasably holding a photosensitive film unit and locating the film unit at a film plane within the cassette in preparation for exposure.

The cassette embodying the present invention is particularly well suited for use with a large format (e.g. 8×10 or larger) film unit that forms a separate "negative" component of a self-developing film assemblage which also includes a "positive" component comprising an image receiving sheet having a rupturable container of fluid processing composition at one end thereof.

In the illustrated embodiment, the cassette is designed for radiographic applications and includes an interior bearing surface against which one side of the film unit is to bear in intimate contact to locate it at the film plane, and an intensifying screen that is adapted to be urged into intimate contact with the opposite photosensitive side of the film unit to enhance image formation when the intensifying screen emits visible light in response to impingement of X-ray radiation thereupon. Provisions are also made for daylight loading of an X-ray sensitive film unit that is initially provided with an opaque envelope covering the photosensitive portion thereof for protecting the film unit from ambient light until it is safely located within the light excluding environment of the cassette housing.

Cassettes of this type generally include some type of mechanism for selectively applying pressure to the film unit in a direction transverse to the film plane. Initially, after the film unit is loaded into the cassette it is desirable that this pressure be at a minimum so that the opaque envelope may be withdrawn through a light sealed passageway at one longitudinal end of the cassette by advancing it in a direction parallel to the film plane. However, before the cassette is mounted on an appropriate apparatus of film exposure, it is desirable that increased pressure be applied to the film unit so that one side thereof is urged into intimate contact with the film bearing surface while the intensifying screen is urged into intimate contact with the opposite side of the film unit. Following exposure, it is desirable to once again minimize this pressure to facilitate the advancement of the exposed film unit in a direction parallel to the film plane through a light seal passageway at the opposite end of the cassette so that it may be advanced into superposition with the image receiving sheet for processing whereby the superposed sheets are advanced between a pair of pressure applying rollers in a film processor for releasing the fluid from the rupturable container and distributing it between the superposed negative and positive sheets to initiate a well-known development and diffusion transfer process.

Cassettes designed for use with large format self-developing film units are, of course, well-known in the prior art.

One type of cassette includes a base section and a cover section that are coupled together for movement between an open position for film loading and a single closed position wherein structure associated with the cover section applies a given pressure, in a direction transverse to the film plane, for urging one side of the film unit into intimate contact with a film plane defining bearing surface and for urging the intensifying screen into intimate contact with the opposite side of the film unit. For representative examples of this type of cassette, see U.S. Pat. Nos. 2,689,306; 3,371,208; 3,383,507; and 3,804,625. However, these patents disclose that the amount of pressure applied is critical and must be balanced to provide enough pressure for good intimate contact and yet not so much as to inhibit the withdrawal of the opaque envelope or the subsequent advancement of the exposed film unit from the cassette for processing. While this type of structure may work well, it will be obvious to those skilled in the art that the individual piece parts of the cassette must be manufactured to relatively high tolerances to maintain the critical pressure thereby increasing the manufacturing cost of these cassettes. Also, one may expect that the normal wear and tear on the cassette inherent in extended use may adversely affect the cassette's ability to maintain a pressure in the critical range.

Another type of large format cassette includes a base section and cover section that are coupled together for movement between an open position for film loading and a closed position wherein the cassette is rendered light tight and a minimum of pressure is applied to the film unit in a direction transverse to the film plane to facilitate envelope withdrawal and the subsequent removal of the exposed film unit for processing. Additionally, these cassettes include a movable pressure mechanism and some type of actuating system which allows the pressure to be suitably increased for good intimate contact of the film unit with the bearing surface and the intensifying screen with the photosensitive side of the film unit. For example, see U.S. Pat. Nos. 2,709,223 and 3,103,864 wherein the cover section of the cassette includes a rectangular frame having a movable pressure plate mounted therein and a cam and lever arrangement that is actuable to load the pressure plate and urge it toward the film plane to provide the required pressure. Also see U.S. Pat. No. 2,823,317 where the opening in the frame of the cover section is covered with a flexible diaphragm which is deflected by a platen and clamp mechanism to increase pressure in the direction transverse to the film plane. U.S. Pat. No. 3,174,039 discloses a cassette having a lever mechanism which is actuated to move a pressure plate associated with the cover section. Still another type of cassette, disclosed in U.S. Pat. Nos. 3,327,155 and 3,330,953, utilizes an inflatable air bag for increasing the pressure in a direction transverse to the film plane. Also see commonly-assigned copending application U.S. Ser. No. 841,889 now U.S. Pat. No. 4,186,308 filed on Oct. 13, 1977 by Herman E. Erikson which discloses a cassette having a movable pressure plate disposed between fixed exterior cassette wall and an actuating cam system for moving the pressure plate toward and away from the base plate.

While these cassettes do provide the desirable feature of being able to vary the pressure for good intimate contact on one hand and withdrawal of the envelope and film unit on the other hand, the addition of the pressure plate or air bag and the required actuating mechanisms for these devices generally make these cassettes more mechanically complex and expensive to manufacture than is desirable.

Therefore, it is an object of the present invention to provide a cassette that is suitable for use with a large format film unit, allows pressure thereon in a direction transverse to the film plane to be varied, and yet is of simple construction and low cost.

It is yet another object of the invention to provide such a cassette that doesn't require the use of a movable pressure plate per se and its accompanying actuating mechanisms.

Other objects of the invention will, in part, be obvious and will, in part, appear hereinafter.

SUMMARY OF THE INVENTION

The present invention provides a simply constructed cassette for releasably holding a photosensitive film unit and locating the film unit at a film plane therein.

While the illustrated embodiment of the cassette is designed for radiographic applications and includes an intensifying screen therein, the cassette may also be configured for use with conventional large format film units that are exposed witn visible light without departing from the spirit and scope of the invention herein involved.

The cassette includes a base section including a bottom wall and opposed laterally spaced side walls. The bottom wall includes a generally planar interior bearing surface against which at least a marginal portion of the film unit is to bear in intimate contact to locate the film unit at the film plane.

Cooperating with the base section is a cover section which includes a generally planar top wall and opposed laterally spaced side walls. The cover section is positionable over the base section with their respective side walls in telescoping relation so that the bearing surface and the top wall are in substantially parallel opposed relation. By this telescoping arrangement, the base and cover sections, in their entirety, are movable relative to one another in a direction generally transverse to the film plane between a first closed position, wherein the top wall is spaced from the bearing surface by a given distance and the base and cover sections cooperate to define a light tight cassette housing for holding a film unit therein and having a light seal passageway at one longitudinal end thereof through which the film unit may be advanced in a direction generally parallel to the film plane to remove the film unit from the housing, and a second closed position wherein the top wall is closer to the bearing surface than when located in the first closed position so that the spacing therebetween is less than the given distance.

The cassette is also provided with independently operable means for releasably latching the base and cover sections together in each of the first and second closed positions. Additionally, the cassette includes means associated with the cover section that are operative when the base and cover sections are located in the second closed position for applying sufficient pressure to the film unit to urge at least the marginal portions thereof into intimate contact with the bearing surface and are responsive to locating the base and cover sections in the first closed position for reducing the pressure sufficiently to allow the film unit to slide over the bearing surface with minimal friction to facilitate its advancement through the passageway.

In the illustrated embodiment, the cassette is configured for radiographic applications and includes an intensifying screen that is coupled to and spaced from the interior surface of the cover section top wall by a resiliently compressible pad. Also, the cassette is configured for daylight loading and includes a second light seal passageway at the opposite end of the cassette for removing an opaque protective envelope initially supplied with the film unit. Preferably, both passageways are light sealed by resiliently compressible light seals which also provide a biasing force that urges the base and cover sections toward the first closed position.

In a preferred embodiment, at least a portion of the cover section is pivotably mounted so that it may be opened to provide access to the bearing surface of the base section for film loading. Thereafter, the portion of the cover section is pivoted to the first closed position. In this configuration, the cover section is spaced from the base section by a sufficient distance such that the intensifying screen on the underside of the resiliently compressible pad does not apply any appreciable pressure to the film unit. This allows the envelope to be withdrawn through the passageway at one end of the cassette.

Once the envelope is withdrawn, the cover section is manually pushed downwardly toward the base section where it is automatically latched in the second closed position. In this configuration, the resilient pad is compressed and provides a biasing force in a direction transverse to the film plane for urging one side of the film unit into intimate contact with the bearing surface and for urging the intensifying screen into intimate contact with the photosensitive side of the film unit. After the cassette is mounted on an x-ray apparatus and the film unit therein is exposed, the latching system is actuated to release the latches holding the cover and base sections in their second closed position thereby allowing the biasing force provided by the compressed light seals to automatically move the base and cover sections back to the first closed position. In this configuration, the pressure on the film unit is reduced to a minimum thereby allowing it to slide over the bearing surface with minimum frictional forces thereon to remove it from the cassette for processing.

By providing the telescoping operation of the base and cover sections and a latching system operative to releasably latch the cover and base sections in their first and second closed positions, it is unnecessary to provide the cassette with a separate pressure plate and actuating mechanism therefor to vary the pressure on the film unit. That is, the cover section top wall serves both as an exterior wall of the cassette housing and as a pressure plate to apply maximum pressure to the film unit when the base and cover sections are releasably latched in the second closed position.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
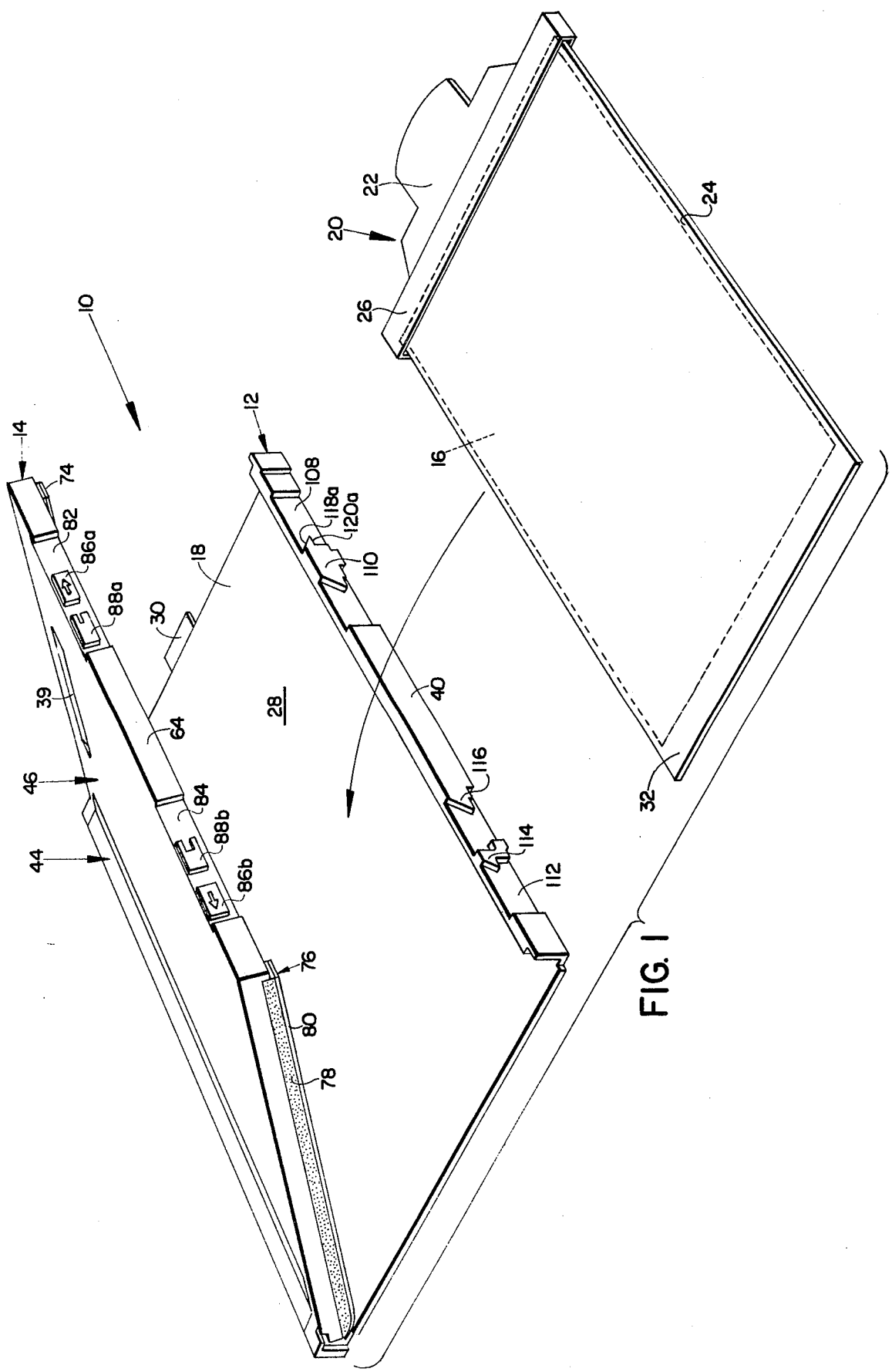
FIG. 1 is a perspective view of a cassette embodying the present invention shown in its open position and a photosensitive film unit assembly configured for use with the cassette.
Figure 2:
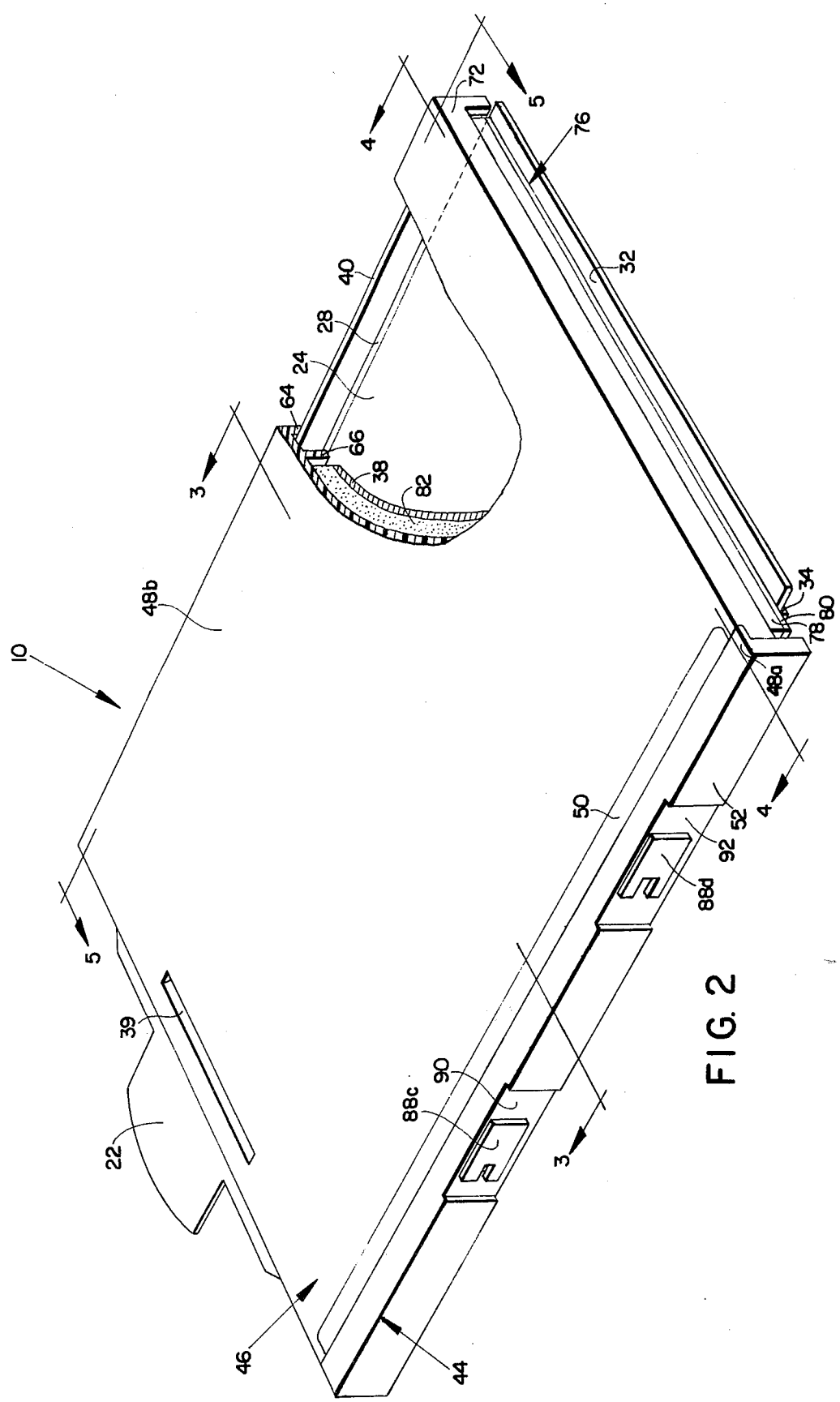
FIG. 2 is a perspective view of the cassette of FIG. 1 showing the cassette in a first closed position holding the film unit assembly with a portion of the cassette removed to show its interior construction.

With reference to FIGS. 1 and 2, the present invention provides a cassette 10, formed by a base section 12 and a cover section 14, for releasably holding a large format (e.g., 8×10) photosensitive film unit 16 and locating film unit 16 at a film plane within cassette 10 in preparation for exposure.

In the illustrated embodiment, cassette 10 is configured for radiographic applications and the film unit 16 is exposed by X-rays transmitted through a solid generally planar bottom wall 18 of base section 12 which is formed of material that is opaque to visible light but is substantially transparent to X-rays. However, cassette 10 may be modified, without departing from the scope and spirit of the invention herein involved, for use with conventional large format black and white or color film units that are sensitive to visible light by providing an exposure aperture in wall 18. The exposure aperture would normally be covered by a dark slide that is removed for exposure once the cassette 10 is mounted on the back of a conventional 8×10 view camera.

Preferably, cassette 10 is designed for daylight loading and readily accepts a "negative" film assembly 20 which is a separate component of a large format self-developing film assemblage that also includes a "positive" film assembly (not shown).

Film assembly 20 includes the photosensitive film unit 16 comprising a rectangular base sheet having one or more photosensitive layers coated on one side thereof; a film manipulation leader 22 coupled to one end of film unit 16; and an opaque envelope 24 which covers film unit 16 to protect it from ambient illumination. Envelope 24 is releasably coupled to leader 22 at the open top end of envelope 24 which is inserted under the wall of an encircling envelope retaining cap 26 on leader 22.

In use, a major portion of the cover section 14 of cassette 10 is pivoted away from the base section 12, as shown in FIG. 1, providing access to a generally planar interior film bearing surface 28 of bottom wall 18 for manually placing the film assembly 20 thereon. Wall 18 has a flexible rectangular tab 30 projecting outwardly from a leading edge thereof. When film assembly 20 is placed on surface 28, it is manipulated so that the center portion of the rear side of cap 26 slides over tab 30 to releasably retain film assembly 20 at its correct longitudinal position relative to base section 12.

Cover 14 is then closed to locate and releasably latch it at its first closed position, shown in FIGS. 2, 3A 4A and 5A where it cooperates with base section 12 to form a light-tight cassette housing about the film unit 16. With the cassette in this configuration, the closed trailing end 32 of envelope 24 projects outwardly of the cassette housing through a laterally extending light sealed trailing end opening or passageway 34, and the leader 22 extends outwardly through a light seal opening or passageway 36 at the leading end of the cassette 10. The opaque envelope 24 now may be withdrawn from film unit 16 by pulling it rearwardly through trailing end opening 34. The coupling of tab 30 with the leader cap 26 prevents the film unit 16 from sliding rearwardly in the cassette during this operation. The cover section 14 is then manually pushed downwardly toward base section 12, thereby moving it closer to the base section where it is automatically releasably latched in its second closed position shown in FIGS. 3B, 4B and 5B. When cover section 14 is so located, the photosensitive film unit 16 is pressed between the film bearing surface 28 of bottom wall 18 and a flat intensifying screen 38 mounted on the interior side of cover section 14. In this manner, one side of film unit 16 is urged into intimate contact with bearing surface 28 to locate the film unit 16 at a film plane defined by surface 28 and the opposite side of film unit 16, having the one or more photosensitive layers thereon, is urged into intimate contact with the intensifying screen 38.

To prevent damage to leader 22, it may be folded up (along with flexible tab 30) and back over cover section 14 where the forwardly extending narrow position may be inserted through a slot 39 and into a storage cavity within cover section 14 (not shown).

The cassette 10 is then mounted on a suitable X-ray apparatus and a film unit 16 therein is exposed. Following exposure, the later-to-be-described latches holding cover 14 in its second closed position, are released and cover section 14 automatically returns to its first closed position to relieve the pressure on film unit 16. Thereafter, the cassette 10 is mounted on a suitable processing apparatus (not shown) and a film unit 16 is withdrawn from cassette 10 by pulling on leader 22 to advance it through leading end opening 36. As the film unit 16 is advanced forwardly, the leader 22 is coupled to a complementary leader on the positive component of the self-developing film assemblage to bring film unit 16 into superposed relation with an image-receiving sheet. The superposed sheets are advanced through a pair of pressure applying rollers for rupturing a container on the image-receiving sheet holding a supply of fluid processing composition which is then distributed between the negative and positive sheets to initiate a well-known development and diffusion transfer process.

For a detailed description of the structural and chemical composition of self-developing film assemblages suitable for use with cassette 10, reference may be had to U.S. Pat. No. 2,983,606, issued to H. G. Rogers and U.S. Pat. Nos. 2,544,268; 2,565,378; 2,698,236; 2,698,237; and 2,698,245 all of which issued to E. H. Land.

The base and cover sections 12 and 14 are generally rectangular, longitudinally extending, substantially rigid components formed of any suitable relatively stiff material that is opaque to visible light but is substantially transparent to X-ray radiation. In the interests of low cost and ease of manufacture, the major structural parts of base and cover sections 12 and 14 preferably are of molded plastic construction. One plastic material that is suitable for this application is 40% carbon-filled polyphenylene sulfide.

Figure 3A:
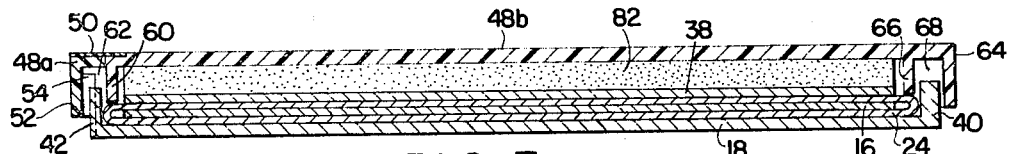
FIG. 3A is a cross-sectional view of the cassette taken along line 3—3 of FIG. 2 showing a medial portion of the cassette in its first closed position.
Figure 3B:
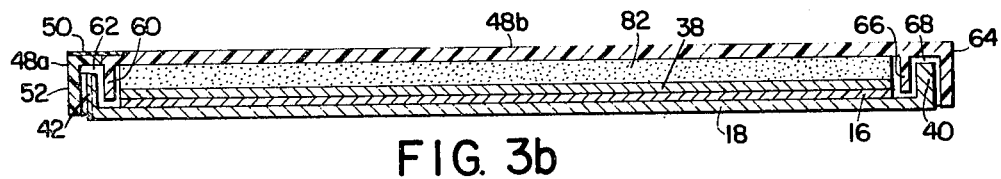
FIG. 3B is similar in some respects to FIG. 3A, but shows the cassette in its second closed position.
Figure 4A:
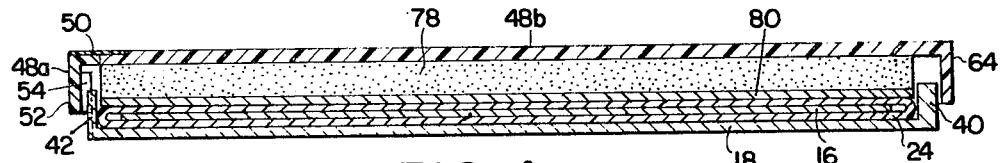
FIG. 4A is a cross-sectional end view of the cassette taken along line 4—4 of FIG. 2 showing one end of the cassette in its first closed position.
Figure 4B:
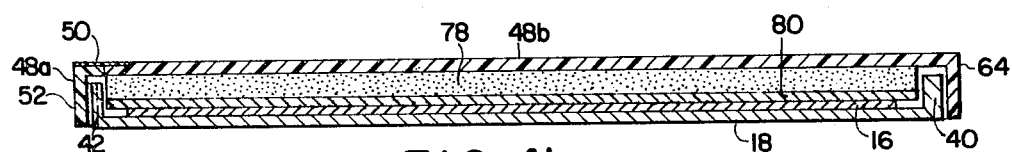
FIG. 4B is similar in some respects to FIG. 4A, but shows the cassette in its second closed position.

The base section 12 includes the previously noted generally planar bottom wall 18 having the generally planar interior film bearing surface 28 for defining the film plane, and an integrally formed pair of opposed, laterally spaced, side walls 40 and 42 upstanding from the lateral edges of bottom wall 18 as most clearly shown in FIGS. 3A and 3B.

Integrally formed on the exterior side of side wall 40 are a plurality of latch camming and detent surfaces forming part of a later-to-be-described cassette latching system. Integrally formed on the exterior side of side wall 42 are additional latch camming and detent surfaces and later-to-be-described structure for coupling base and cover sections 12 and 14 together for vertical sliding movement in a direction transverse to the film plane defined by surface 28.

The cover section 14 comprises a first cover section member 44 coupled to the side wall 42 of base section 12 for vertical sliding movement relative thereto between the first and second closed positions, and a second cover section member 46 pivotally coupled to first cover section member 44 for pivotal motion relative thereto between the open position and the first closed position. As best shown in FIGS. 2-4B, when cover section 14 is in the first and second closed positions, members 44 and 46 cooperate to define a generally planar top wall defined by a relatively narrow top wall section 48a on first member 44 and a much wider top wall section 48b on second member 46. Top wall sections 48a and 48b are joined together, adjacent base section side wall 42, by a flexible hinge 50 secured across top wall sections 48a and 48b where their facing lateral edges meet. Hinge 50 may be formed of any flexible plastic material such as polypropolene or polyethylene.

As best shown in FIGS. 3A-4B and FIGS. 6-8, the first cover section member 44 includes an exterior side wall 52 integrally formed with and depending from the outside lateral edge of top wall section 48a. Integrally formed with side wall 52, on the interior side thereof, are three generally T-shaped connectors 54 that are captured in complementary receiving slots 56 integrally formed on the exterior side of base section side wall 42. In order to limit the upward movement of cover section side wall 52 relative to base section side wall 42 so that it is accurately located in the first closed position, cover section side wall 52 includes a pair of longitudinally spaced and inwardly extending stop fingers 58 which engage a pair of complementary stops or detents 59 integrally formed on the outwardly facing side of base section side wall 42 as most clearly shown in FIG. 8.

The second cover section member 46 includes an integrally formed interior side wall 60 depending from the left lateral edge of top wall section 48b (as viewed in FIGS. 3A and 3B) on the interior side of base section side wall 42 in opposed relation to the side wall 52 on member 44. The side walls 52 and 60 are spaced in parallel relation to define a longitudinal channel 62 therebetween for receiving the base section side wall 42. On the opposite or right-hand end of cover section 46 is an integrally formed pair of longitudinally extending and laterally spaced side walls 64 and 66 which depend from top wall section 48b and define a longitudinally extending channel 68 therebetween for receiving the base section side wall 40 when cover section 14 is in its first and second closed positions.

The second cover section member 46 also includes integrally formed depending leading and trailing end walls, 70 and 72 respectively, which extend between the outermost side walls of member 46. Leading and trailing end walls 70 and 72 are configured so that the lower horizontal edges thereof do not extend down to the bearing surface 28 of base section bottom wall 18. Thus when the second cover section member 46 is in the first closed position, the leading end wall 70 cooperates with the leading edge of bottom wall 18 to define the leading end cassette opening 36 and the trailing end wall 72 cooperates with the opposite longitudinal end of bottom wall 18 to define the trailing end cassette opening 34.

As best shown in FIGS. 1, 2 4A and 4B, cassette 10 includes means for light sealing the leading and trailing end cassette openings or passageways 36 and 34 when cover section member 46 is in the first closed position in the form of laterally extending resiliently compressible light seals 74 and 76.

Each of the light seals 74 and 76 comprises a strip of resiliently compressible material 78, such as a rubber or plastic foam, secured to the interior surface of top wall section 48b and a thin black nylon plush pile strip 80 securing to the bottom surface of strip 78 in facing relation to bearing surface 28 of base section bottom wall 18. The nylon plush material is preferably of the type known as Vertipile, manufactured by Vertipile, Inc. of Lowell, MA.

When cover section member 46 is in its first closed position, the side walls of the base and cover sections are in telescoping relation so as to form labyrinth light seals along the lateral edges of the cassette and the leading and trailing end light seals 74 and 76 block the cassette passageways 36 and 34. In this manner, cassette 10 is rendered light tight when the cover section member 46 is in its first closed position. The telescoping side wall construction also allows the entire cover section 14 and the entire base section 12 to be moved relative to one another in a direction transverse to the film plane.

Secured to the interior side of top wall section 48b is a laminate structure comprising a resiliently compressible plastic or rubber foam pad 82, extending laterally between interior side walls 60 and 66 and longitudinally between the leading and trailing end light seals 74 and 76, and the intensifying screen 38 secured to the underside of pad 82 and dimensioned to be substantially coextensive therewith.

The intensifying screen 38 is formed to include one or more rare earth phosphors which provide a visible light fluorescent glow when struck by x-ray radiation. With screen 38 in contact with the photosensitive surface of film unit 16, the visible light emitted from screen 38 when x-ray radiation is incident thereupon intensifies the latent image formed on film unit 16. By using such an intensifying screen, a good latent image may be formed on film unit 16 with lower intensity x-ray radiation than if screen 38 is not used. However, for best results, the front surface of screen 38 must be pressed securely against the film unit 16 so that there is intimate contact therebetween The combined thickness of the foam pad 82 and intensifying screen 38 is less than the thickness of the leading and trailing end light seals 74 and 76, each formed by foam strip 78 and nylon plush strip 80. This means that when the cover section member 46 is in the first closed position, the nylon plush strips 80 of the leading and trailing end seals 74 and 76 will engage the bearing surface 28 of base section bottom wall 18, and maintain cover section member 46 in the first closed position, while the intensifying screen 38 is spaced from bearing surface 28 by a given distance that will allow the thickness of a film unit 16 and its enclosing opaque envelope 24 to be interposed between screen 38 and surface 28 without having intensifying screen 38 apply pressure to this portion of film unit assembly 20.

When the cover section 14 is moved downwardly to its second closed position after envelope 24 is withdrawn, such as shown in FIG. 3B, the intensifying screen 38 bears up against film unit 16 and is urged into intimate contact therewith by the biasing force provided by the resiliently compressed pad 82. This biasing force also causes screen 38 to apply pressure to film unit 16 in a direction transverse to the film plane so that the opposite side of film unit 16 is urged into intimate contact with biasing surface 28.

In the illustrated embodiment, cassette 10 includes six independent latching mechanisms, two of which are operative to releasably latch the cover and base sections 14 and 12 together in the first closed position and four latches for releasably latching sections 14 and 12 together in the second closed position.

In FIG. 1 it will be seen that exterior side wall 64 of cover section 4 includes forward and aft recess sections 82 and 84. Slidably mounted in recess 82 is a first closed position latch release button 86a and a second closed position latch release button 88a. A second set of similar release buttons, 86b and 88b respectively, are slidably mounted in the aft recess section 84. The recessed sections 82 and 84 are provided so that release buttons 86 and 88 (a and b) will not extend outwardly beyond the exterior surface of side wall 64.

As best shown in FIG. 2, the opposite exterior side wall 52 of cover section 14 includes a forward recessed section 90 and an aft recessed section 92. Slidably mounted in recess 90 is a second closed position latch release button 88c. Another similar latch release button 88d is provided in recessed section 92.

Figure 5A:
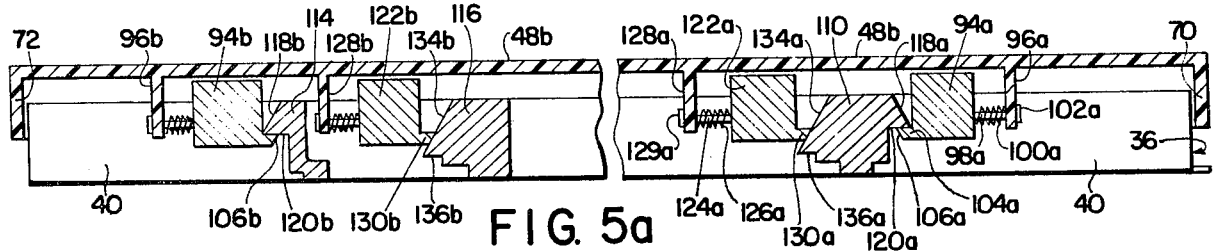
FIG. 5A is a cross-sectional view of one lateral side of the cassette taken along line 5—5 of FIG. 2 to show the disposition of latching devices when the cassette is in its first closed position.
Figure 5B:
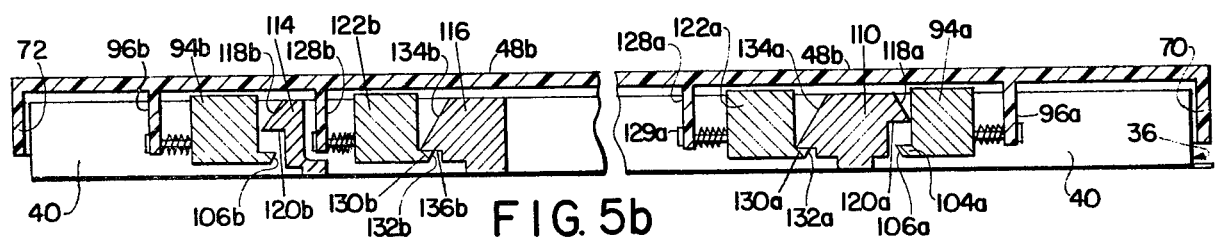
FIG. 5B is similar in some respects to FIG. 5A, but shows the disposition of the latching devices when the cassette is in its second closed position.
Figure 6:
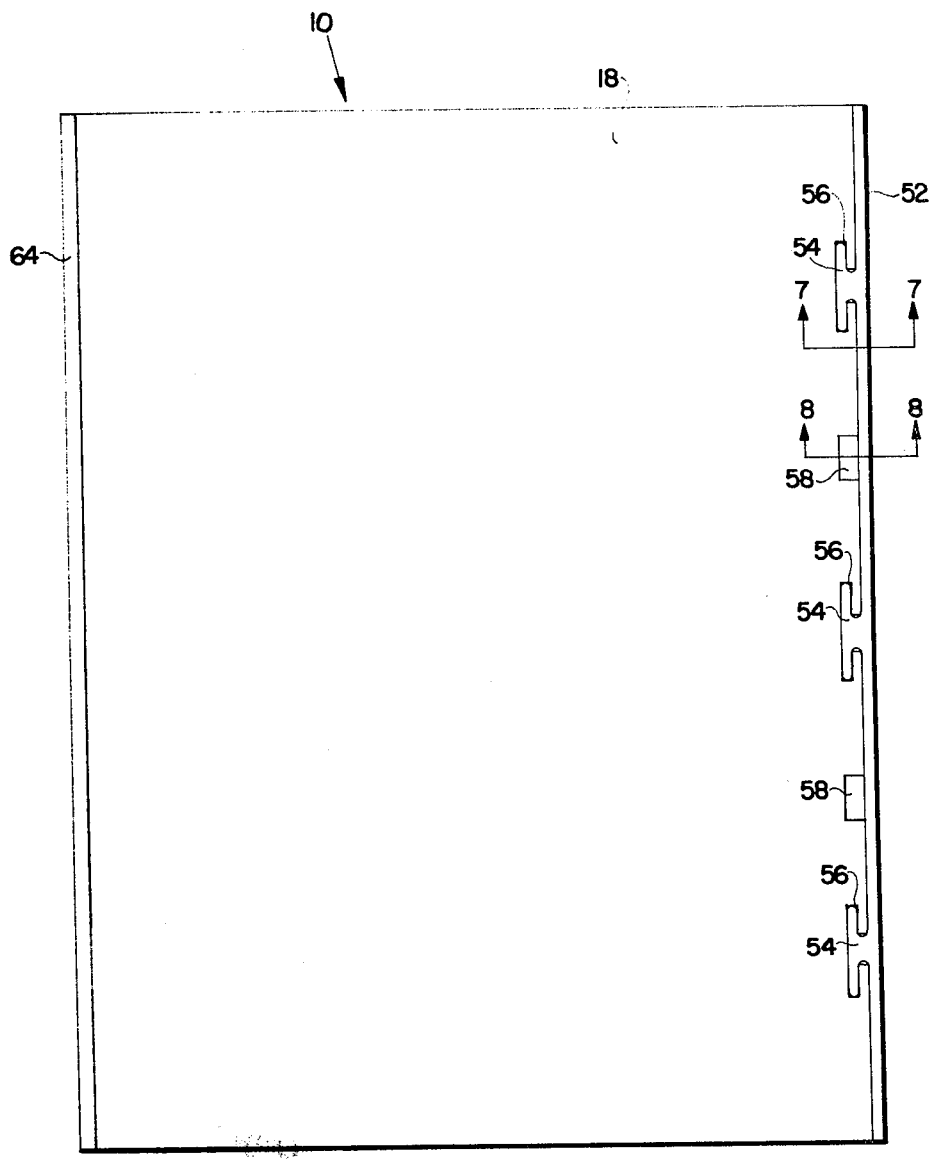
FIG. 6 is a plan view of the underside of the cassette showing the sliding connection between adjacent side walls of cassette cover and base sections.
Figure 7:
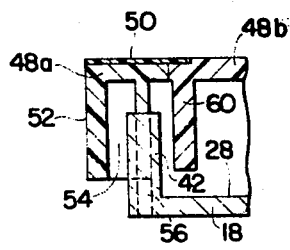
FIG. 7 is a cross-sectional view of the side wall coupling structure taken along line 7—7 of FIG. 6.
Figure 8:
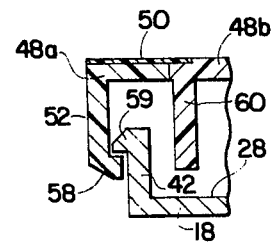
FIG. 8 is a cross-sectional view of side wall position stop structure taken along line 8—8 of FIG. 6.

The structure and operation of the latching system is most clearly shown in FIGS. 5A and 5B. The latch release buttons 86a and 86b are coupled through longitudinal slots in the recesses 82 and 84 to corresponding first closed position latch members 94a and 94b slidably mounted in the channel 68 between the depending side walls 64 and 66 of cover section member 46.

Latch member 94a is movably coupled to a depending tab 96a in channel 68 by means of a pin 98a having one of its ends fixed to latch member 94a and its opposite end extending through a receiving hole in tab 96a. A pring 100a coiled around pin 98a serves to bias the latch member 94a to the left in a direction away from tab 96c. A peened over head 102a on pin 98a maintains latch member 94a in coupled relation to tab 96a. The end of latch member 94a opposite pin 98a is provided with a forwardly projecting foot 104a that terminates in an inclined or angled cam follower surface 106a.

As most clearly shown in FIGS. 1, 5A and 5B, the exterior surface of side wall 40 of base section 12 is provided with a forward recessed section 108 having an integrally molded outwardly projecting detent member 110 approximately at its center, and an aft recessed section 112 having an integrally molded first closed position detent member 114 projecting outwardly from the approximate center of recessed station 112 and a second closed position detent member 116 projecting outwardly from the right end of recessed section 112.

The right-hand portion of detent member 110 serves as a detent for the first closed position latch member 94a and includes a downwardly inclined cam surface 118a and, therebelow, a reentrant step or horizontal detent surface 120a.

The structure of latch member 94b, its mounting and operation and the structure of detent member 114 are identical to that described in relation to latch member 94a and the detent member surfaces 118a and 120a. The only difference being that latch member 94b is mounted for movement in the opposite direction from member 94a with the corresponding portions of detent member 114 appropriately facing in the opposite direction from those corresponding surfaces on detent member 110.

The latch release button 88a is secured to a corresponding second closed position latch member 122a located in the channel 68 on the opposite side of detent member 110 from first closed position latch member 94a.

Latch member 122a is similar in its construction to the latch member 94a and is mounted in substantially the same manner. That is, latch member 122a includes a slide pin 124a having a biasing spring 126a therearound. The opposite end of pin 124a extends through an appropriate opening in depending mounting tab 128a and is peened over as suggested at 129a to retain pin 124a in the opening. The forwardly projecting latch foot 130a terminates in a downwardly inclined cam follower surface 132a. The spring 126a biases member 122a to the right as viewed in FIGS. 5A and 5B so that in the first closed position the cam follower surface 132a is in engagement with an elongated ramp or inclined cam surface 134a on the left side of detent member 110. Below cam surface 134a is a reentrant step or horizontal surface 136a which is lower down on the side wall 40 than is the detent surface 120a for the first closed position latch member 94a.

The latch release slide button 88b is coupled to another second closed position latch member 122b adjacent detent member 116. Member 122b is biased for movement in the same direction as latch member 122a and the corresponding cam surface 134b and detent surface 136b are found on the detent member 116.

Although not shown in the drawings, it will be understood that the latch release buttons 88c and 88d are respectively coupled to an additional pair of second closed position latch members 122c and 122d (not shown) that are provided in the opposite longitudinal channel 62 of cover section 14 and that the side wall 42 of base section 12 has corresponding detent members therefor that are identical to the detent structure on the left side of detent member 110 and detent member 116.

The operation of the cassette latch system will now be described with reference to FIGS. 5A and 5B.

When the cover section member 46 is opened (i.e. not in engagement with structure on the side wall 40 of base section 12) the biasing spring 100a locates latch member 94a in a position to the left of that shown in FIG. 5A. Also biasing springs 100b, 124a and 124b respectively locate latch members 94b, 122a and 122b at positions to the right of those shown in FIG. 5A.

As cover section member 46 is pivoted downwardly, the cam follower surfaces on each of the four latch members comes into engagement with their respective cooperating inclined cam surfaces on the various detent members. That is, inclined cam surface 106a on foot 104a of latch member 94a engages the complementary inclined cam surface 118a on the upper right-hand portion of detent member 110. Likewise, cam follower surface 106b on foot 104b of latch member 94b engages its complementary cam surface 118b on detent member 114; cam follower surface 132a on foot 130a of latch member 122a engages the complementary cam surface 134a on the left side of detent member 110; and cam follower surface 132b on foot 130b of latch member 122b engages the complementary cam surface 134b on detent member 116.

As the cover section 14 is further pivoted downwardly, in a direction transverse to the film plane defined by bearing surface 28, the cam following surfaces of the four latch members follow the inclined cam surfaces and retract the latch members against the force of their respective biasing springs. As cover section 14 reaches the first closed position, the foot sections 104a and 104b of latch members 94a and 94b clear the cam surfaces 118a and 118b causing latch members 94a and 94b to be moved by their respective biasing springs to locate foot sections 104a and 104b under their respective detent surfaces 120a and 120b. It will be noted that in the first closed position the latch members 22a and 22b are still in contact with their respective longer cam surfaces 134a and 134b and therefore these two second closed position latch members are not in latching engagement with their respective detent members 110 and 116.

It should also be noted that the second pair of second closed position latch members 122c and 122d (not shown) on the opposite side of the cassette are in parallel operation and they, too, are not in latching engagement with their respective detent members (not shown).

The action of the latch members 94a and 94b releasably latches the cover section 14 and base section 12 together in the first closed position. Of course, the cooperating stop fingers 58 on cover section side wall 52 engage the stops 59 on base section side wall 42 to accurately locate the left side of cassette 10 in the first closed position.

Without a film assembly 20 in cassette 10, the cover section 14 is held in this first position by the upward bias provided by the resiliently compressible light seal 74 and 76 at the opposite longitudinal ends of cover section 14. That is, the nylon plush strips 80 of seals 74 and 76 are in bearing relation with the longitudinal ends of bearing surface 28. In the central portion of cassette 10, the foam pad 82 supporting intensifying spring 38 is in its uncompressed state and the front surface of intensifying screen 38 is spaced from bearing surface 28 by a known distance to accommodate the film unit 16 in its enclosing envelope 24 therebetween without applying any significant compressive pressure on this portion of film assembly 20.

The cassette is located in its second closed position by manually pushing downwardly on the top wall of cover section 14 to move the entire cover section 14 closer to the base section 12. In response to this movement, the second closed position latch members 122a, 122b, and the two latch members 122c and 122d on the opposite side of cassette 10 move further down their respective cam surfaces 134 until the foot sections 130 clear the lower edge of cam surfaces 134 and allow the biasing springs to urge latch members 122 to the right (as viewed in FIGS. 5A and 5B) so that the foot sections 130 slide under the detent surfaces 136 thereby releasably latching the cover section 14 in its second closed position. At the same time, the latch members 94a and 94b move downwardly and are maintained in their latching attitude by the corresponding detent members and their biasing springs.

Without a film unit 20 in cassette 10 foam strips 78 of the light seals 74 and 76 are further compressed and the intensifying screen 38 is in contact with bearing surface 28 being urged thereagainst by the resilient pad 82 which is now under compression.

To unlatch the cover section 14 for movement from a second closed position to the first closed position, the four latch release slide buttons 88a, 88b, 88c and 88d are moved rearwardly to cause the corresponding latch members 122a, 122b, 122c and 122d to move rearwardly against the force of their biasing springs so that the respective foot sections 130 clear the detent surfaces 136 thereby allowing the entire cover section 14 to move upwardly from the configuration shown in FIG. 5B to the first closed position shown in FIG. 5A whereupon the first closed position latch members 94a and 94b become reengaged with the detent surfaces 120a and 120b.

The biasing force for automatically moving the cover section 14 upwardly relative to base section 12 to the first closed position is primarily provided by the foam strips 78 of end light seal 74 and 76 which return to their unstressed state.

To unlatch cover section member 46 for movement to the open position, slide members 86a and 86b are manually moved in opposite directions to retract their respective latch members 94a and 94b from engagement with d-tent members 110 and 114.

While the illustrated cassette 10 is designed for radiographic applications, those skilled in the art will appreciate that the cassette may be easily modified for use in conventional photographic applications.

Rather than providing a solid bottom wall 18, the bottom wall may be modified by providing a generally rectangular exposure aperture therein that is coextensive with the photosensitive portion of film unit 16. To prevent fogging of the film unit prior to mounting the cassette 10 on the back of a conventional view camera, the exposure aperture would be covered by a removable dark slide which will be withdrawn to uncover the exposure aperture to present film unit 16 at the camera's focal plane. In such a modified cassette 10, the intensifying screen 38 is unnecessary and may be eliminated. When the modified cassette 10 is in its second closed position, the resilient pad 82 would apply pressure to the film unit 16 so that the marginal portions thereof about its periphery are urged into intimate contact with the generally planar bearing surface surrounding the rectangular exposure aperture.

Having described the structural and functional features of the cassette 10 and film assembly 20, the operation of the illustrated cassette 10 will now be reviewed.

It will be assumed that cassette 10 is supported on a flat surface such as a table top and is located in its first closed position.

To open cassette 10, the user manually slides the first closed position latch release buttons 86a and 86b in opposite directions indicated by the arrows thereon thereby releasing latch members 94a and 94b from their latch relation with detents 120a and 120b. The second cover section member 46 then may be pivoted open about hinge 50 to the open position of FIG. 1 to provide access to the interior bearing surface 28 of cassette bottom wall 18. The film assembly 20 is then placed on bearing surface 28 and the cap portion 26 is slipped over flexible tab 30 to accurately position film assembly 20 longitudinally with respect to cassette 10. Cover section second member 46 is then pivoted downwardly until the latch members 94a and 94b automatically become engaged with detents 120a and 120b to releasably latch cassette 10 in its first closed position. As noted earlier, the longitudinal labyrinth light seals defined by the telescoping side walls of the base and cover section and the end light seals 74 and 76 render cassette 10 in a light tight condition. The intensifying screen 38 may touch the opaque envelope 24 of film assembly 20 but does not apply any appreciable pressure thereto. The only pressure exerted on film assembly 20 at this point is provided by the end light seals 74 and 76. The opaque envelope 24 is grasped by its trailing end 32 extending outwardly from cassette end opening 34 and is pulled rearwardly through opening 34 to remove it from cassette 10. Because the envelope 24 is only engaged by end light seals 74 and 76, it is easily withdrawn in a direction parallel to the film plane and slides over bearing surface 28 with minimal friction.

Once envelope 24 is removed, the user manually pushes down on the top wall of the cover section to move the entire cover section 14 closer to the base section 12 in a direction generally perpendicular to the film plane until the four second closed position latch members 122a, 122b, 122c and 122d releasably latch the cover and base sections together in the second closed position. In response to such movement, the resilient pad 82 in cover section 14 is compressed thereby providing a force in a direction transverse to the film plane for urging the intensifying screen 38 into intimate contact with one side of film unit 16 while simultaneously urging the opposite side thereof into intimate contact with the bearing surface 28. The film leader is then folded up and back over top wall section 48b and its leading end is inserted through slot 39 to locate it in its storage position.

Cassette 10 is then mounted on an X-ray apparatus which transmits X-ray radiation through bottom wall 18 to expose film unit 16. As noted earlier, the incidence of X-ray radiation on intensifying screen 38 causes it to emit visible light which enhances the formation of the latent image in the photosensitive layers of film unit 16.

Following exposure, cassette 10 is removed from the X-ray apparatus and the second closed position latch members 122a, 122b, 122c and 122d are released by actuating the release buttons 88a, 88b, 88c and 88d. Upon release of these four latch members, the cassette cover section 14 automatically returns to the first latch position under the biasing force provided by the end light seals 74 and 76 which return to their uncompressed state. This action relieves the pressure on the film unit 16 so that it may be easily advanced over bearing surface 28 with minimal friction to remove it from cassette 10, through opening 36, and bring it into superposed relation with a positive image receiving sheet for processing.

In a preferred embodiment, cassette 10 is configured to be inserted into a cassette receiving tray on a large format self-developing film processor (not shown). The cassette receiving tray thereon preferably includes means for automatically actuating the second closed position latch release buttons 88a, 88b, 88c and 88d when the cassette 10 is located at an operative position on the cassette receiving tray. Thus, by inserting cassette 10 into the tray, it is automatically unlatched thereby allowing base cover sections 12 and 14 to move from the second closed position to the first closed position to facilitate the coupling of the exposed film unit 16 with an image receiving sheet held in the tray so that the exposed film unit 16 and image receiving sheet may be fed into the bite of a pair of processing rollers within the large format processor. For a detailed description of such a processor and cassette receiving tray having latch releasing structure that cooperates with the latch release buttons 88 on cassette 10, reference may be had to copending application U.S. Ser. No. 108,453 filed by Daniel A. Buldini on even date herewith.

Since certain changes may be made in the above cassette without departing from the scope of the invention herein involved, it is intended that all matter contained in the above description or shown in the accompanying drawings shall be interpreted as illustrative and not in a limiting sense.

What is claimed is:

1. A cassette for releasably holding a photosensitive film unit and locating the film unit at a film plane therein, said cassette comprising:
    a base section including a bottom wall and opposed laterally spaced side walls, said bottom wall having a generally planar interior bearing surface against which at least a marginal portion of such a film unit is to bear in intimate contact to locate the film unit at said film plane;
    a cover section including a generally planar top wall and opposed laterally spaced side walls, said cover section being positionable over said base section with their respective side walls in telescoping relation and said bearing surface and said top wall in substantially parallel opposed relation whereby said base and cover sections are movable relative to one another in a direction generally transverse to said film plane between a first closed position, wherein said top wall is spaced from said bearing surface by a given distance and said base and cover sections cooperate to define a light tight cassette housing for holding the film unit therein and having a light sealed passageway at one longitudinal end thereof through which the film unit may be advanced in a direction generally parallel to said film plane to remove the film unit from said housing, and a second closed position wherein said top wall is closer to said bearing surface than when located in said first closed position so that the spacing therebetween is less than said given distance;
    means for releasably latching said base and cover sections together in each of said first and second closed positions; and
    means on the interior of said top wall and operative when said base and cover sections are located in said second closed position for applying sufficient pressure to the film unit to urge at least the marginal portions thereof into intimate contact with said bearing surface and responsive to locating said base and cover sections in said first closed position for reducing said pressure sufficiently to allow the film unit to slide over said bearing surface with minimal friction to facilitate its advancement through said passageway.

2. The cassette of claim 1 wherein one of said cover section side walls is coupled to an adjacent one of said base section side walls for sliding movement relative thereto between said first and second closed positions.

3. The cassette of claim 2 wherein said top wall includes a first top wall member fixedly coupled to said one cover section side wall and a second top wall member carrying the other of said cover section side walls, said first and second top wall members being hinged together so that said second top wall member is pivotable between an open position providing access to said bearing surface for manually placing the film unit thereon and said first closed position.

4. The cassette of claim 3 wherein said latching means is operative to releasably latch said other of said cover section side walls to the adjacent one of said base section side walls when said base and cover sections are located in said first closed position.

5. The cassette of claim 4 wherein said latching means is operative to releasably latch said opposed side walls of said cover section to adjacent ones of said opposed base section side walls when said base and cover sections are in said second closed position.

6. The cassette of claim 1 including means for biasing said cover section toward said first closed position to automatically move said cover from said second closed position to said first closed position upon release of said means for latching said cover section in said second closed position.

7. The cassette of claim 6 wherein said biasing means includes resiliently compressible means that is compressed when said base and cover sections are located in said second closed position and is substantially uncompressed when said base and cover section are located in said first closed position.

8. The cassette of claim 7 wherein said resiliently compressible means form at least a portion of means for light sealing said passageway.

9. The cassette of claim 1 wherein the film unit is initially provided with an opaque envelope covering the photosensitive portion of the film unit, the cover and base sections define a second light sealed passageway, at a longitudinal end of said cassette housing opposite said one longitudinal end, through which the envelope may be withdrawn from said housing and said cassette includes resiliently compressible means for light sealing both of said passageways and for biasing said cover toward said first closed position for automatic return thereto from said second closed position upon release of said means for releasably latching said base and cover sections in said second closed position.

10. The cassette of claim 1 wherein said pressure applying means includes resiliently compressible means which is compressed when said base and cover sections are located in said second position and is substantially uncompressed when said base and cover sections are located in said first closed position.

11. The cassette of claim 10 wherein the film unit is configured to be exposed with X-ray radiation, said bottom wall is formed of material that is opaque to visible light but is substantially transparent to X-ray radiation and said cassette further includes an intensifying screen carried on said resilient means in facing relation to said bearing surface for engaging one side of the film unit in intimate contact while urging its opposite side into intimate contact with said bearing surface when said base and cover sections are located in said second closed position to compress said resilient means.

12. The cassette of claim 1 wherein said latching means includes first latching means for releasably latching said base and cover sections in said first closed position and second latching means, independent of said first latching means, for releasably latching said base and cover sections in said second closed positions.

13. The cassette of claim 12 further including means for biasing said cover section toward said first closed position and wherein said second latching means are operable in response to the manual movement of said cover section from said first closed position to said second closed position against the force of said biasing means, for automatically latching said base and cover sections in said second closed position.

14. A cassette for releasably holding a photosensitive film unit and locating the film unit at a film plane therein, said cassette comprising:

a base section including a bottom wall and opposed laterally spaced side walls, said bottom wall having a generally planar interior bearing surface against which at least a marginal portion of such a film unit is to bear in intimate contact to locate the film unit at said film plane;

a cover section including a generally planar top wall and opposed laterally spaced side walls, said cover section being positionable over said base section with their respective side walls in telescoping relation and said bearing surface and said top wall in substantially parallel opposed relation whereby said base and cover sections are movable relative to one another in a direction generally transverse to said film plane between a first closed position, wherein said top wall is spaced from said bearing surface by a given distance and said base and cover sections cooperate to define a light tight cassette housing for holding the film unit therein and having a light sealed passageway at one longitudinal end thereof through which the film unit may be advanced in a direction generally parallel to said film plane to remove the film unit from said housing, and a second closed position wherein said top wall is closer to said bearing surface than when located in said first closed position so that the spacing therebetween is less than said given distance; and means for releasably latching said base and cover sections together in each of said first and second closed positions;

said cover section being operative when said base and cover sections are located in said second closed position for applying sufficient pressure to the film unit to urge at least the marginal portions thereof into intimate contact with said bearing surface and responsive to locating said base and cover sections in said first closed position for reducing said pressure sufficiently to allow the film unit to slide over said bearing surface with minimal friction to facilitate its advancement through said passageway.

15. An X-ray cassette for releasably holding an X-ray sensitive film unit and locating the film unit at a film plane therein, the film unit being of the type initially including a movable opaque envelope for protecting the film unit from ambient light, said cassette comprising:

a base section including a bottom wall formed of a material that is opaque to visible light but is substantially transparent to X-ray radiation and opposed laterally spaced side walls, said bottom wall having a generally planar interior bearing surface against which the film unit is to bear in intimate contact to locate the film unit at a film plane in preparation for exposure by X-ray radiation transmitted through said bottom wall;

a cover section including a generally planar top wall and opposed laterally spaced side walls, said cover section being positionable over said base section with their respective side walls in telescoping relation and said bearing surface and said top wall in substantially parallel opposed relation whereby said entire base and cover sections are movable relative to one another in a direction generally transverse to said film plane between a first closed position, wherein said top wall is spaced from said bearing surface by a given distance and said base and cover sections cooperate to define a light tight cassette housing for holding the film unit therein and having a first light sealed passageway at one longitudinal end of said housing through which the envelope may be advanced to remove it from said housing and a second light sealed passageway at the opposite longitudinal end of said housing through which the film unit may be advanced to remove it from said housing, and a second closed position wherein said top walls is chosen to said bearing surface than when located in said first closed position so that the spacing therebetween is less than said given distance;

means for releasably latching said base and cover sections together in each of said first and second closed positions;

an intensifying screen configured to be urged into intimate contact with the side of the film unit opposite that side in contact with said bearing surface; and resiliently compressible means, disposed between an interior side of said top wall and said intensifying screen, and being operative when said base and cover sections are in said second closed position for applying sufficient pressure in a direction transverse to said film plane for urging one side of the film unit into intimate contact with said bearing surface and for urging said intensifying screen into intimate contact with the opposite side of said film unit, said resiliently compressible means also being responsive to locating said base and cover section in said first closed position for reducing said pressure sufficiently to allow the envelope, and thereafter the film unit, to slide between said biasing surface and said intensifying screen in a direction generally parallel to said film plane with minimal friction to facilitate their removal from said cassette housing.

16. The cassette of claim 15 wherein said first and second passageways are light sealed, at least in part, by resiliently compressible light sealing member which provide a biasing force for automatically moving said base and cover sections from said second closed position to said first closed position upon release of said latching means releasably latching said base and cover sections in said second closed positions.

17. The cassette of claim 16 wherein said latching means includes independently operable first and second latching devices for respectively releasably latching said base and cover sections in said first and second closed positions.

* * * * *